(12) United States Patent
Taylor et al.

(10) Patent No.: US 9,319,244 B2
(45) Date of Patent: Apr. 19, 2016

(54) METHODS FOR EMAILING LABELS AS PORTABLE DATA FILES AND DEVICES THEREOF

(75) Inventors: Jason Taylor, Wiltshire (GB); Mirco Speretta, Fairfield, CT (US)

(73) Assignee: Usablenet Inc., New York, NY (US)

( * ) Notice: Subject to any disclaimer, the term of this patent is extended or adjusted under 35 U.S.C. 154(b) by 500 days.

(21) Appl. No.: 12/975,990

(22) Filed: Dec. 22, 2010

(65) Prior Publication Data

US 2012/0166551 A1    Jun. 28, 2012

(51) Int. Cl.
*G06F 15/16*    (2006.01)
*H04L 12/58*    (2006.01)
*H04L 29/08*    (2006.01)

(52) U.S. Cl.
CPC ........ *H04L 12/5895* (2013.01); *H04L 12/5835* (2013.01); *H04L 51/38* (2013.01); *H04L 12/584* (2013.01); *H04L 67/2823* (2013.01)

(58) Field of Classification Search
CPC .................................................. H04L 67/2823
USPC .................................. 709/206, 246; 707/760
See application file for complete search history.

(56) References Cited

U.S. PATENT DOCUMENTS

| | | | |
|---|---|---|---|
| 7,080,131 | B2 | 7/2006 | Palevich et al. |
| 2002/0049777 | A1 | 4/2002 | Terayama et al. |
| 2003/0005330 | A1* | 1/2003 | Berkema et al. ............ 713/201 |
| 2004/0073709 | A1* | 4/2004 | Bloomfield .................... 709/246 |
| 2010/0147941 | A1* | 6/2010 | Silverbrook et al. ......... 235/375 |
| 2011/0145150 | A1* | 6/2011 | Onischuk ........................ 705/50 |
| 2011/0196886 | A1* | 8/2011 | Ho et al. ........................ 707/760 |
| 2011/0302197 | A1* | 12/2011 | Silverbrook et al. ......... 707/769 |

FOREIGN PATENT DOCUMENTS

| WO | 03019389 A1 | 3/2003 |
|---|---|---|
| WO | 2007040517 A1 | 4/2007 |

OTHER PUBLICATIONS

International Search Report for International Patent Application No. PCT/US2011/066611 (Jun. 1, 2012).

* cited by examiner

*Primary Examiner* — Glenford Madamba
(74) *Attorney, Agent, or Firm* — LeClairRyan, a Professional Corporation

(57) ABSTRACT

A method, computer readable medium and device that enables emailing a label as a portable data file to destination information associated with a mobile computing device includes obtaining at a proxy server device a web page with a label from a web server device in response to a request from a mobile computing device. The proxy server device obtains destination information for the label associated with the requesting mobile computing device. The proxy server device converts the label into a portable data file and transmits the portable data file using the destination information for the label associated with the requesting mobile computing device.

15 Claims, 3 Drawing Sheets

Confirmation

Dear John Doe, thank you for...

To receive the label as a pdf file please provide your email address.

*Email: [          ]

Notes: [          ]

Logo: [          ] [Browse]

[Send Label]

*Required

*FIG. 2*

METHODS FOR EMAILING LABELS AS PORTABLE DATA FILES AND DEVICES THEREOF

FIELD

This technology relates to methods for emailing labels as portable data files and devices thereof.

BACKGROUND

Some Web based applications, usually developed for desktop browsers, provide functionality for printing labels, such as bar codes, proof of insurance, medical records, or bank statements. All these documents have a well-defined printing format, can include personal information and usually are generated from password protected Web content.

A desktop browser can easily exploit this type of printing functionality. Unfortunately, mobile browsers do not have the same capability since they usually lack a direct connection with a printing device.

SUMMARY

A method for emailing a label as a portable data file to destination information associated with a mobile computing device includes obtaining at a proxy server device a web page with a label from a web server device in response to a request from a mobile computing device. The proxy server device obtains destination information for the label associated with the requesting mobile computing device. The proxy server device converts the label into a portable data file and transmits the portable data file using the destination information for the label associated with the requesting mobile computing device.

A non-transitory computer readable medium having stored thereon instructions for emailing a label as a portable data file to destination information associated with a mobile computing device comprising machine executable code which when executed by at least one processor, causes the processor to perform steps including obtaining a web page with a label from a web server device in response to a request from a mobile computing device. Destination information for the label associated with the requesting mobile computing device is obtained. The label is converted into a portable data file and then is transmitted using the destination information for the label associated with the requesting mobile computing device.

A proxy server device includes one or more processors and a memory coupled to the one or more processors which are configured to execute programmed instructions stored in the memory including obtaining a web page with a label from a web server device in response to a request from a mobile computing device. Destination information for the label associated with the requesting mobile computing device is obtained. The label is converted into a portable data file and then is transmitted using the destination information for the label associated with the requesting mobile computing device.

This technology provides a number of advantages including providing a method, computer readable medium and an apparatus that enables a mobile computing device to create a portable data file of one or more labels and send the portable data file, along with custom information, such as descriptions and logos, to a designated email address associated with the mobile computing device. Accordingly, with this technology data files that are not viewable on mobile computing devices can be downloaded and printed.

BRIEF DESCRIPTION OF THE DRAWINGS

FIG. 2 is a screen shot of an exemplary confirmation page with entry fields for data to generate and send a portable data file.

DETAILED DESCRIPTION

Figure 1:
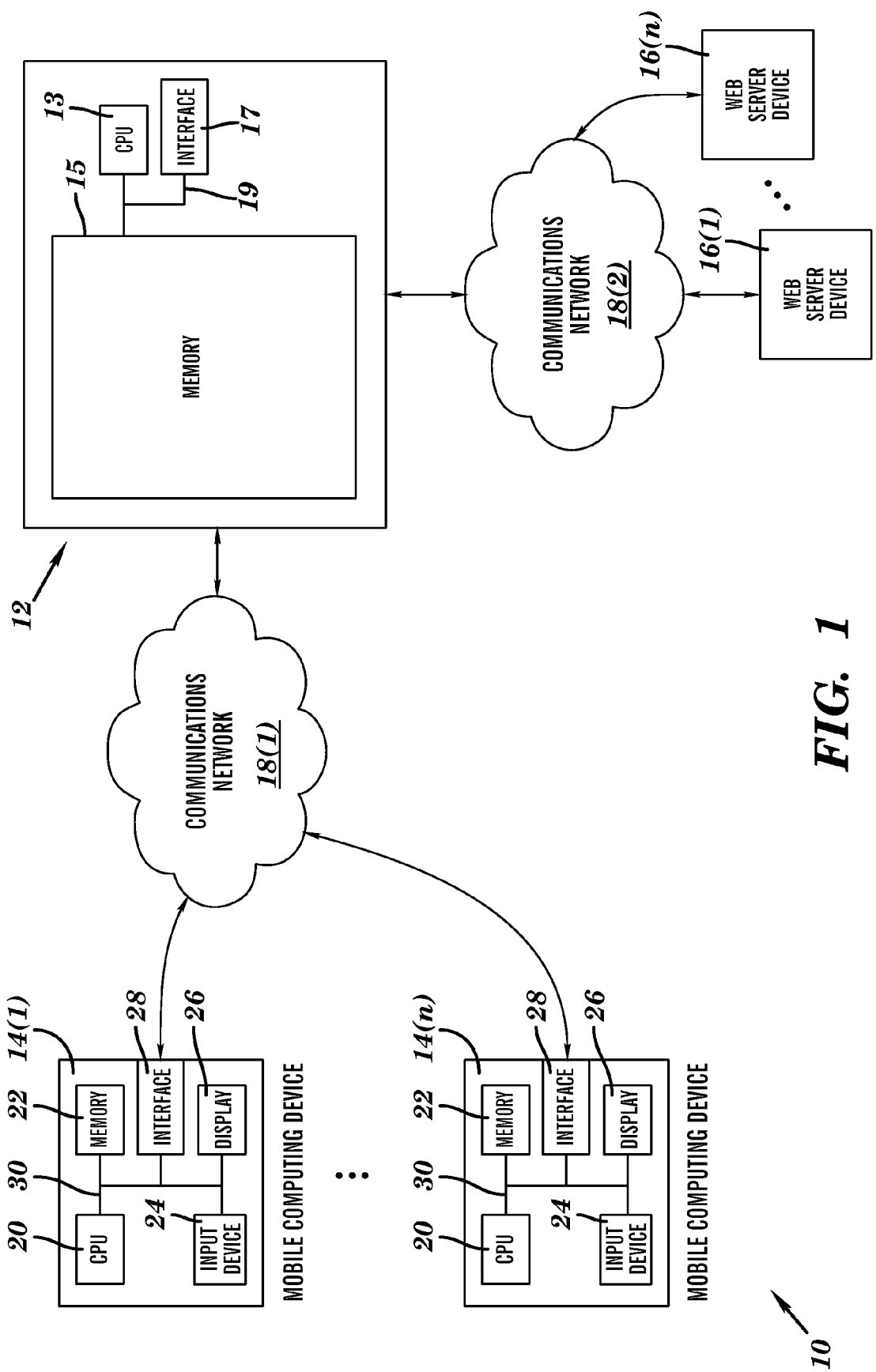
FIG. 1 is a block diagram of an exemplary environment with an exemplary proxy server device.

An exemplary environment 10 with a proxy server device 12 configured to enable one of the mobile computing devices 14(1)-14(n) to download a printable version of a label that was converted into PDF format is illustrated in FIG. 1. The exemplary environment 10 includes the proxy server device 12, mobile computing devices 14(1)-14(n), web content server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium and an apparatus that enables a mobile computing device to create a portable data file of one or more labels and send the portable data file, along with custom information, such as descriptions and logos, to a designated email address associated with a mobile computing device.

Referring more specifically to FIG. 1, the proxy server device 12 is a web content optimization device configured to execute the exemplary methods and other technology illustrated and described herein, although the proxy server can comprise other types of computing devices configured to execute the exemplary methods illustrated and described herein. This exemplary proxy server device 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the proxy server device 12 executes a program of stored instructions one or more aspects of the present invention as described and illustrated by way of the embodiments herein, although the processor could execute other numbers and types of programmed instructions.

The memory 15 in the proxy server device 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the proxy server device 12.

The interface system 17 in the proxy server device 12 is used to operatively couple and communicate between the proxy server device 12 and the mobile computing devices 14(1)-14(n), and the web content server devices 16(1)-16(n) via the communication networks 18(1)-18(2), although other types and numbers of communication networks with other types and numbers of connections and configurations can be used. By way of example only, the communication networks 18(1)-18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the mobile computing devices 14(1)-14(n) enables a user to request, get and interact with documents and other files from one or more web sites hosted by the web content server devices 16(1)-16(n) through the proxy server device 12 via one or more communication networks, although one or more of the mobile computing devices 14(1)-14(n) could access content and utilize other types and numbers of applications from other sources and could provide a wide variety of other functions for the user. Although multiple mobile computing devices 14(1)-14(n) are shown, other numbers and types of user computing systems could be used.

Each of mobile computing devices 14(1)-14(n) in this example is a computing device that includes a central processing unit (CPU) or processor 20, a memory 22, user input device 24, a display 26, and an interface system 28, and which are coupled together by a bus 30 or other link, although one or more of mobile computing devices 14(1)-14(n) can include other numbers and types of components, parts, devices, systems, and elements in other configurations. The processor 20 in each of mobile computing devices 14(1)-14(n) can execute a program of stored instructions for one or more aspects of the present invention as described and illustrated herein, although the processor could execute other numbers and types of programmed instructions.

The memory 22 in each of the mobile computing devices 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the mobile computing devices 14(1)-14(n).

The user input device 24 in each of the mobile computing devices 14(1)-14(n) is used to input request, selections and other data, although the user input device could provide other functions and interact with other elements. The user input device can include keypads, touch screens, and/or vocal input processing systems although other types and numbers of user input devices can be used.

The display 26 in each of the mobile computing devices 14(1)-14(n) is used to show data and information to the user, such as a website page optimized for viewing on a mobile computing device by way of example only. The display in each of the mobile computing devices 14(1)-14(n) is a computer screen display, although other types and numbers of displays could be used depending on the particular type of mobile device.

The interface system 28 in each of the mobile computing devices 14(1)-14(n) is used to operatively couple and communicate between the mobile computing devices 14(1)-14(n) and the proxy server device 12, and the web content server devices 16(1)-16(n) over the communication networks 18(1)-18(2), although other types and numbers of communication networks with other types and numbers of connections and configurations can be used.

The web content server devices 16(1)-16(n) provide one or more pages from one or more web sites, although the web content server devices 16(1)-16(n) can provide other numbers and types of applications and/or content and can have provide other numbers and types of functions. Although web content server devices 16(1)-16(n) are shown for ease of illustration and discussion, other numbers and types of web server systems and devices can be used.

Each of the web content server devices 16(1)-16(n) include a central processing unit (CPU) or processor, a memory, and an interface system which are coupled together by a bus or other link, although each of the web content server devices 16(1)-16(n) could have other numbers and types of components, parts, devices, systems, and elements in other configurations and locations can be used. The processor in each of the web content server devices 16(1)-16(n) executes a program of stored instructions one or more aspects of the present invention as described and illustrated by way of the embodiments herein, although the processor could execute other numbers and types of programmed instructions.

The memory in each of the web content server devices 16(1)-16(n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web content server devices 16(1)-16(n).

The interface system in each of the web content server devices 16(1)-16(n) is used to operatively couple and communicate between the web content server devices 16(1)-16(n) and the proxy server device 12, the mobile computing devices 14(1)-14(n), and the client computing devices 15(1)-15(n) via communication networks 18(1)-18(2), although other types and numbers of communication networks with other types and numbers of connections and configurations can be used.

Although embodiments of the proxy server device 12, the mobile computing devices 14(1)-14(n), and the web content server devices 16(1)-16(n), are described and illustrated herein, each can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 3:
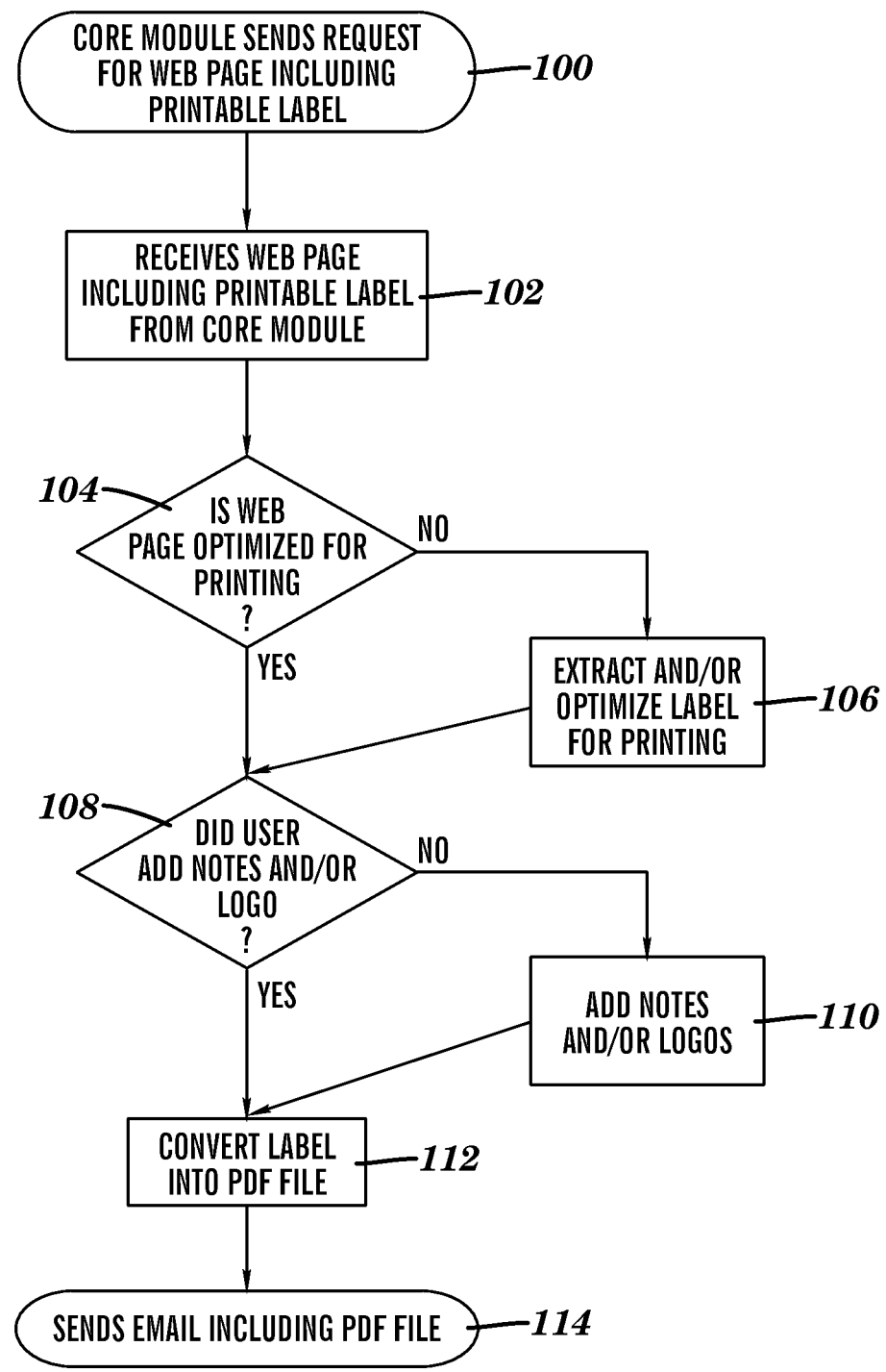
FIG. 3 is a flow chart of an exemplary method for generating and emailing labels as portable data files and devices thereof.

An exemplary method for emailing labels as portable data files and devices thereof will now be described with reference to FIGS. 1-3. Referring more specifically to FIG. 3, in step 100 the proxy server device 12 receives an HTTP request for a web page from one of the mobile computing devices 1491)-14(n). The proxy server device 12 transmits the request to one of the web server devices 16(1)-16(n) hosting the website with the requested content.

In step 102, the proxy server device 12 receives the requested content, such as a web page including a printable label from the one of the web server devices 16(1)-16(n) hosting the website with the requested content. The printable label can comprise a variety of different printable content which is not viewable on the requesting one of the mobile computing devices 14(1)-14(n), such as a bar code, proof of insurance, medical record, or bank statement by way of example.

In step 104, the proxy server device 12 determines whether the web page with the printable label from the one of the web server devices 16(1)-16(n) is optimized for printing. If in step 104, the proxy server device 12 determines the web page with the printable label is not optimized for printing, then the No branch is taken to step 106. In step 106, the proxy server device 12 extracts and/or optimizes the printable label for printing and then proceeds to step 108. If in step 104, the proxy server device 12 determines the web page with the printable label is optimized for printing, then the Yes branch is taken to step 108.

In step 108, the proxy server device 12 determines whether a user at the requesting one of the mobile computing devices 14(1)-14(n) has provided notes and/or logos as well as an email address to receive the generate portable data file, although other types of data and destination information could be used. If in step 108 the proxy server device 12 determines the user at the requesting one of the mobile computing devices 14(1)-14(n) has not provided any notes and/or logos as well as an email address associated with the requesting one of the mobile computing devices 14(1)-14(n), then the No branch is taken to step 110. In step 110, the proxy server device 12 transmits a web page, such as the one shown in FIG. 2, to the requesting one of the mobile computing devices 14(1)-14(n) to obtain notes and/or logos as well as an email address associated with the requesting one of the mobile computing devices 14(1)-14(n) to receive the label, although other manners of obtaining customizing and addressing information relating to the label could be used. The proxy server device 12 adds the obtained notes and/or logos or other data from entries in the fields shown in FIG. 2 to customize the label and then proceeds to step 112.

If in step 108 the proxy server device 12 determines the user at the requesting one of the mobile computing devices 14(1)-14(n) has not added notes and/or logos for the label and already has provided an email address, then the Yes branch is taken to step 112. In step 112, the proxy server device 12 converts the customized label into a PDF file, although the label can be converted in other numbers and types of portable data files for transmission.

In step 114, the proxy server device 12 transmits the generated label to the email address associated with the requesting one of the mobile computing devices 14(1)-14(n). The proxy server device 12 may optionally send a confirmation to the requesting one of the mobile computing devices 14(1)-14(n) that the PDF or other portable data file has been sent. The user associated with the requesting one of the mobile computing devices 14(1)-14(n) can later access the email account through for example a desktop computing device connected to a printer to print the customized label which was not viewable on the requesting one of the mobile computing devices 14(1)-14(n).

Accordingly, as illustrated and described herein this technology provides a number of advantages including providing a method, computer readable medium and an apparatus that enables a mobile computing device to create a portable data file of one or more labels and send the portable data file, along with custom information, such as descriptions and logos, to a designated email address associated with the mobile computing device. One of the advantages of this technology is that mobile computing devices can now obtain labels that were not viewable on the mobile computing device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for emailing a label as a portable data file, the method comprising:

obtaining by a proxy server device a web page that includes a printable label from a web server device in response to a request for the web page received from a mobile computing device not connected to a printing device, the label having an electronic format and comprising digital content not viewable on a display of the mobile computing device;

obtaining by the proxy server device destination information for the label, the destination information comprising an electronic mail address of a user of the mobile computing device from which the request for the web page that includes the label was obtained;

extracting by the proxy server device the label from the web page and converting the label that is not viewable on a display of the mobile device into a portable data file; and transmitting by the proxy server device the portable data file using the destination information for the label.

2. The method as set forth in claim 1 further comprising:
determining by the proxy server device whether the web page with the label is optimized for printing; and
extracting and optimizing by the proxy server device the label for printing when the determining indicates the web page and label are not optimized for printing.

3. The method as set forth in claim 1 further comprising:
obtaining by the proxy server device at least one label customization from the mobile computing device; and
customizing by the proxy server device the label based on the label customization prior to converting the label into the portable data file.

4. The method as set forth in claim 1 wherein the portable data file is a PDF file.

5. The method as set forth in claim 1 wherein the obtaining further comprises obtaining the destination information for the label from a digital web page form provided to the requesting mobile computing device in an electronic format.

6. A non-transitory computer readable medium having stored thereon instructions for emailing a label as a portable data file comprising machine executable code which when executed by at least one processor, causes the processor to perform steps comprising:
obtaining a web page that includes a printable label from a web server device in response to a request for the web page received from a mobile computing device not connected to a printing device, the label having an electronic format and comprising digital content not viewable on a display of the mobile computing device;
obtaining destination information for the label, the destination information comprising an electronic mail address of a user of the mobile computing device from which the request for the web page that includes the label was obtained;
extracting the label from the web page and converting the label that is not viewable on a display of the mobile device into a portable data file; and
transmitting the portable data file using the destination information for the label.

7. The medium as set forth in claim 6 further comprising machine executable code which when executed by the at least one processor causes the processor to perform steps further comprising:
determining whether the web page with the label is optimized for printing; and
extracting and optimizing the label for printing when the determining indicates the web page and label are not optimized for printing.

8. The medium as set forth in claim 6 further comprising machine executable code which when executed by the at least one processor causes the processor to perform steps further comprising:
obtaining at least one label customization from the mobile computing device; and
customizing the label based on the label customization prior to converting the label into the portable data file.

9. The medium as set forth in claim 6 wherein the portable data file is a PDF file.

10. The medium as set forth in claim 6 wherein the obtaining further comprises obtaining the destination information for the label from a digital web page form provided to the requesting mobile computing device in an electronic format and the destination information comprises an email address for the user of the requesting mobile computing device.

11. A proxy server device comprising:
one or more processors; and
a memory coupled to the one or more processors which are configured to execute programmed instructions stored in the memory comprising:
obtaining a web page that includes a printable label from a web server device in response to a request for the web page received from a mobile computing device not connected to a printing device, the label having an electronic format and comprising digital content not viewable on a display of the mobile computing device;
obtaining destination information for the label, the destination information comprising an electronic mail address of a user of the mobile computing device from which the request for the web page that includes the label was obtained;
extracting the label from the web page and converting the label that is not viewable on a display of the mobile device into a portable data file; and
transmitting the portable data file using the destination information for the label.

12. The device as set forth in claim 11 wherein the one or more processors is further configured to execute programmed instructions stored in the memory further comprising:
determining whether the web page with the label is optimized for printing; and
extracting and optimizing the label for printing when the determining indicates the web page and label are not optimized for printing.

13. The device as set forth in claim 11 wherein the one or more processors is further configured to execute programmed instructions stored in the memory further comprising:
obtaining at least one label customization from the mobile computing device; and
customizing the label based on the label customization prior to converting the label into the portable data file.

14. The device as set forth in claim 11 wherein the portable data file is a PDF file.

15. The device as set forth in claim 11 wherein the obtaining further comprises obtaining the destination information for the label from a digital web page form provided to the requesting mobile computing device in an electronic format and the destination information comprises an email address for the user of the requesting mobile computing device.

\* \* \* \* \*